(12) United States Patent
Iijima

(10) Patent No.: US 9,886,061 B2
(45) Date of Patent: Feb. 6, 2018

(54) INFORMATION PROCESSING APPARATUS

(71) Applicant: FUJITSU LIMITED, Kawasaki-shi, Kanagawa (JP)

(72) Inventor: Takashi Iijima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/208,083

(22) Filed: Jul. 12, 2016

(65) Prior Publication Data

US 2017/0052569 A1     Feb. 23, 2017

(30) Foreign Application Priority Data

Aug. 18, 2015 (JP) ................. 2015-160982

(51) Int. Cl.
*G06F 1/16* (2006.01)
*E05B 65/00* (2006.01)

(52) U.S. Cl.
CPC ........ *G06F 1/1635* (2013.01); *E05B 65/0067* (2013.01); *G06F 1/1616* (2013.01); *G06F 1/1656* (2013.01)

(58) Field of Classification Search
None
See application file for complete search history.

(56) References Cited

U.S. PATENT DOCUMENTS

| | | | | |
|---|---|---|---|---|
| 5,677,827 A * | 10/1997 | Yoshioka | ............. | G06F 1/1616 |
| | | | | 361/679.58 |
| 7,495,899 B2 * | 2/2009 | Liu | .................... | H01M 2/1066 |
| | | | | 361/679.28 |
| 7,512,397 B2 * | 3/2009 | Liu | ....................... | H04B 1/3883 |
| | | | | 361/616 |
| 7,630,742 B2 * | 12/2009 | Park | ..................... | G06F 1/1613 |
| | | | | 455/128 |
| 7,892,668 B2 * | 2/2011 | Choi | ................... | H01M 2/1066 |
| | | | | 429/100 |
| 7,986,530 B2 * | 7/2011 | Chang | ................ | H01M 2/1066 |
| | | | | 361/747 |
| 8,094,439 B2 * | 1/2012 | Lin | .................... | H01M 2/1066 |
| | | | | 361/679.01 |
| 8,102,645 B2 * | 1/2012 | Zhang | ..................... | H01H 9/00 |
| | | | | 361/679.01 |
| 8,254,114 B2 * | 8/2012 | Lin | ....................... | E05B 65/006 |
| | | | | 361/679.01 |
| 8,264,826 B2 * | 9/2012 | Tobiyama | ............ | G06F 1/1613 |
| | | | | 248/917 |
| 8,295,039 B2 * | 10/2012 | Cheng | .................. | G06F 1/1616 |
| | | | | 361/679.26 |
| 8,379,385 B2 * | 2/2013 | Miyagi | .................... | E05C 1/00 |
| | | | | 361/679.26 |

(Continued)

FOREIGN PATENT DOCUMENTS

JP     2003-347758     12/2003

*Primary Examiner* — Xanthia C Cunningham
(74) *Attorney, Agent, or Firm* — Fujitsu Patent Center

(57) ABSTRACT

An information processing apparatus includes: a housing including a stepped portion on an outer surface; a cover configured to cover at least a part of the outer surface; a lock member movable between a lock position at which the cover is locked with respect to the housing and an unlock position at which the cover is unlocked with respect to the housing; and an operation member, disposed at the stepped portion, configured to move the lock member between the lock position and the unlock position.

14 Claims, 19 Drawing Sheets

(56) References Cited

U.S. PATENT DOCUMENTS

| | | | |
|---|---|---|---|
| 8,693,190 B2* | 4/2014 | Chang | G06F 1/1679 312/223.1 |
| 8,837,147 B2* | 9/2014 | Liang | G06F 1/1616 361/679.01 |
| 8,916,280 B2* | 12/2014 | Lee | H01M 2/1077 429/99 |
| 8,937,808 B2* | 1/2015 | Tu | H01M 2/0404 361/679.3 |
| 2003/0022633 A1* | 1/2003 | Chen | H04B 1/3883 455/575.1 |
| 2004/0192418 A1* | 9/2004 | Nam | H01M 2/1022 455/575.1 |
| 2007/0091556 A1* | 4/2007 | Wu | G06F 1/1616 361/679.57 |
| 2007/0097614 A1* | 5/2007 | Hsiao | G06F 1/1616 361/679.02 |
| 2007/0122693 A1* | 5/2007 | Qin | H01M 2/1066 429/97 |
| 2007/0206352 A1* | 9/2007 | Lee | G06F 1/1613 361/679.43 |
| 2008/0055840 A1* | 3/2008 | Tanaka | G06F 1/1616 361/679.19 |
| 2009/0059482 A1* | 3/2009 | Hsu | H01M 2/1061 361/679.01 |
| 2010/0330400 A1* | 12/2010 | Hu | H01M 2/1061 429/50 |
| 2012/0268900 A1* | 10/2012 | Fan | H01M 2/1055 361/747 |
| 2012/0307428 A1* | 12/2012 | Liang | G06F 1/1635 361/679.01 |

* cited by examiner

US 9,886,061 B2

INFORMATION PROCESSING APPARATUS

CROSS-REFERENCE TO RELATED APPLICATION

This application is based upon and claims the benefit of priority of the prior Japanese Patent Application No. 2015-160982, filed on Aug. 18, 2015, the entire contents of which are incorporated herein by reference.

FIELD

The embodiments discussed herein are related to an information processing apparatus.

BACKGROUND

Electronic devices include a battery lid that closes a battery chamber over a battery housed in the battery chamber, and a lock member that fixes the battery lid and that also fixes the battery.

A related technology is disclosed in Japanese Laid-open Patent Publication No. 2003-347758.

SUMMARY

According to an aspect of the embodiments, an information processing apparatus includes: a housing including a stepped portion on an outer surface; a cover configured to cover at least a part of the outer surface; a lock member movable between a lock position at which the cover is locked with respect to the housing and an unlock position at which the cover is unlocked with respect to the housing; and an operation member, disposed at the stepped portion, configured to move the lock member between the lock position and the unlock position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The information processing apparatus, in which a cover such as a lid that covers a part of a housing is locked and unlocked by a lock member, for example, is provided with an operation member that moves the lock member.

If the operation member protrudes from the outer surface of the housing, the thickness of the information processing apparatus may be increased for an amount corresponding to the protrusion of the operation member.

A notebook personal computer may be applied as the information processing apparatus.

Figure 1:
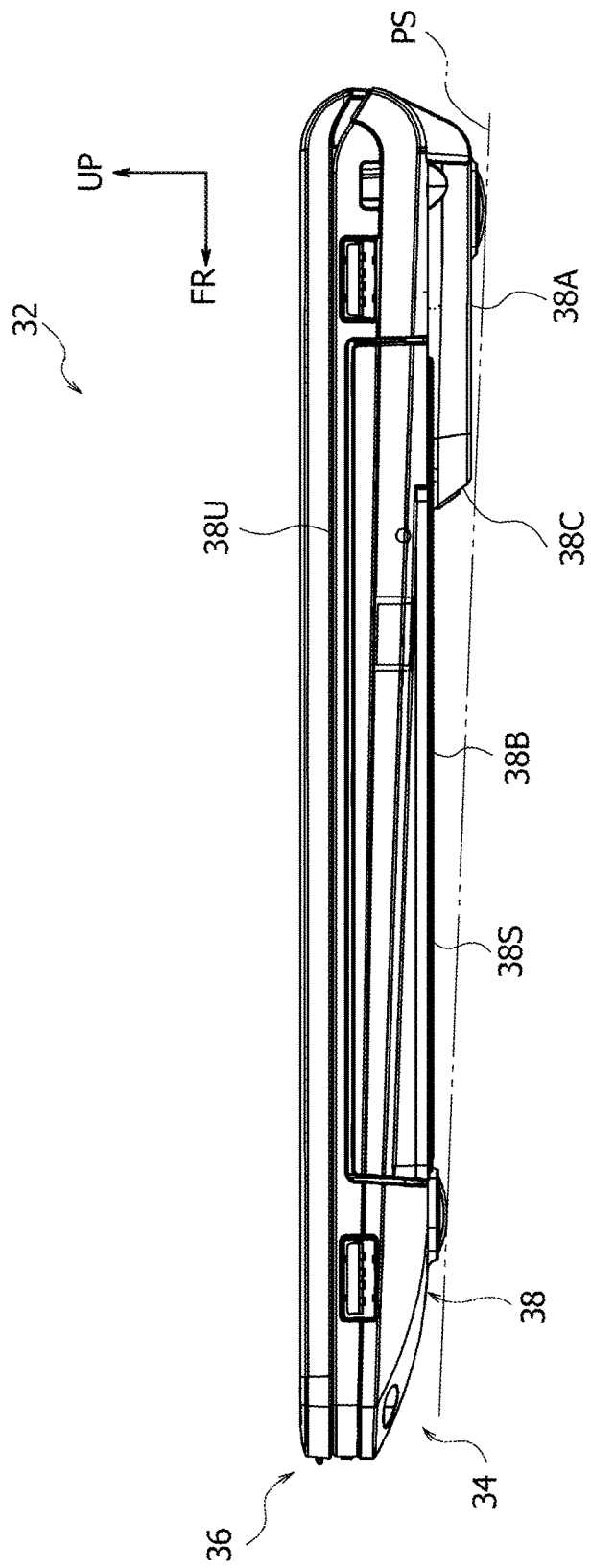
FIG. 1 illustrates an exemplary side view of an information processing apparatus.
Figure 2:
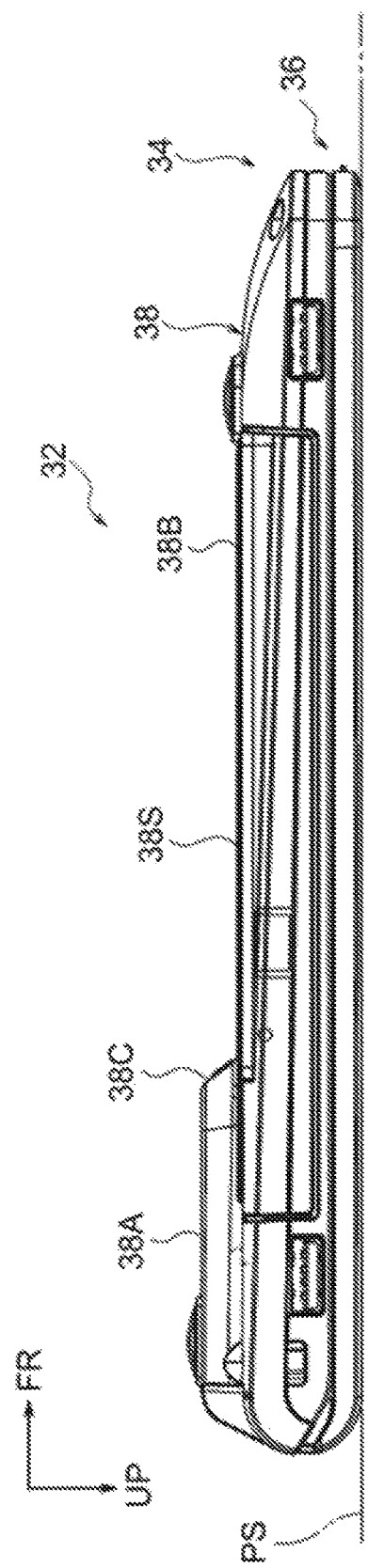
FIG. 2 illustrates an exemplary side view of the information processing apparatus as inverted upside down.

As illustrated in FIGS. 1 and 2, a notebook personal computer 32 includes a main device 34 and a display device 36 coupled to the main device 34 through a hinge or the like in a turnable manner (foldable manner).

Figure 3:
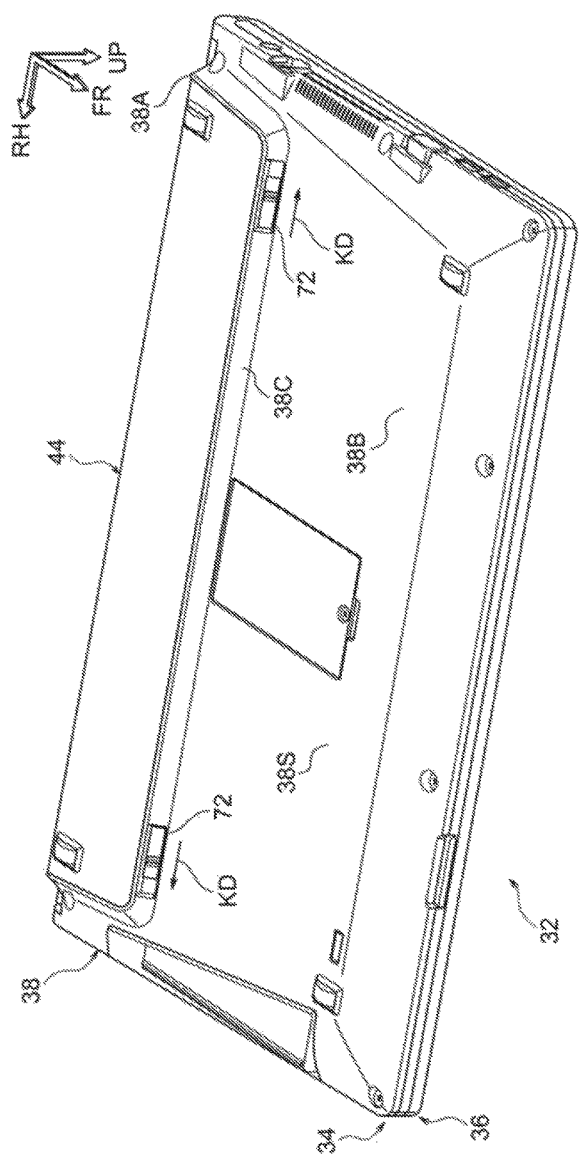
FIG. 3 illustrates an exemplary perspective view of the information processing apparatus as seen from the bottom surface side.
Figure 4:
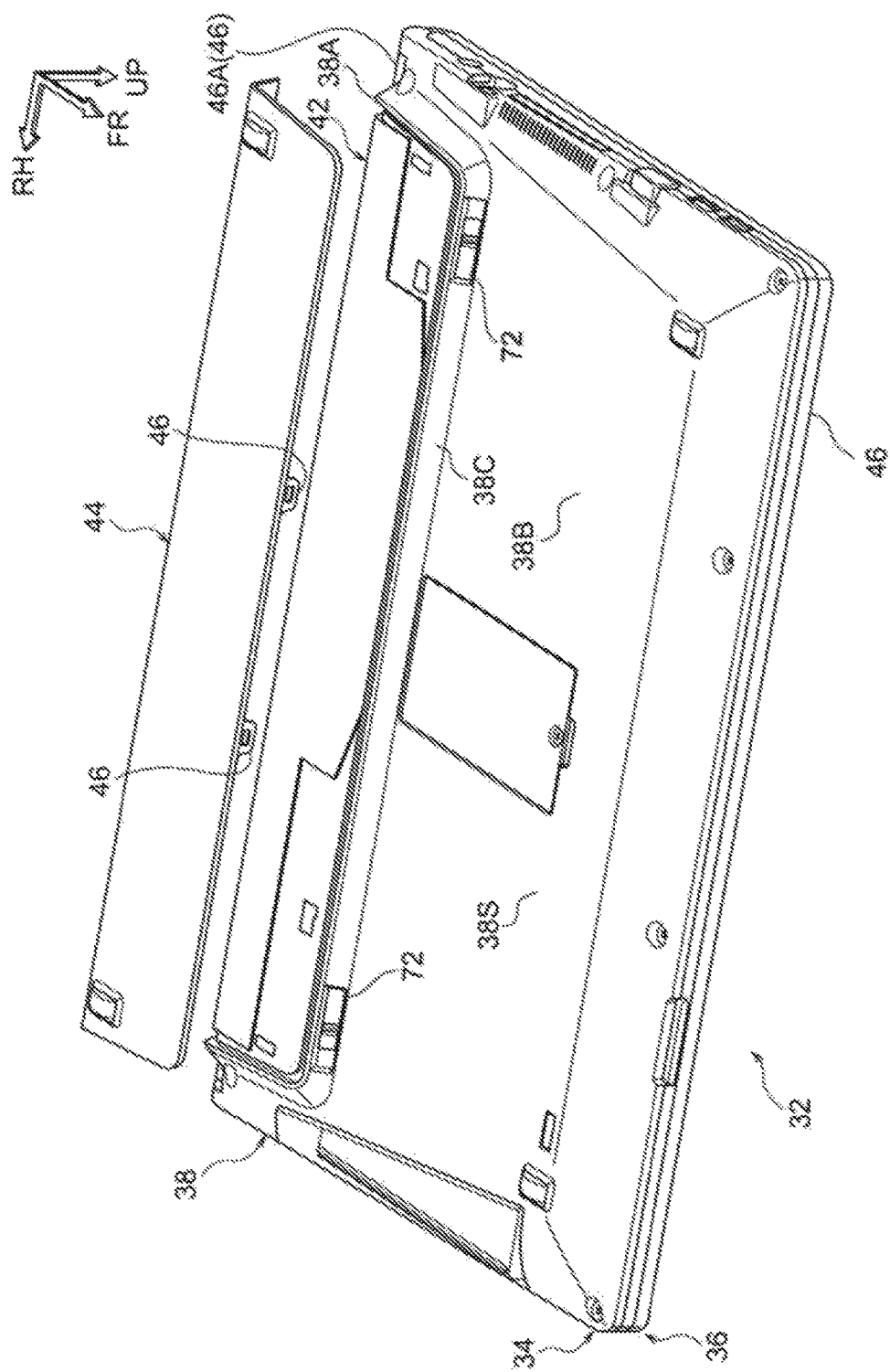
FIG. 4 illustrates an exemplary perspective view of the information processing apparatus with a cover separated as seen from the bottom surface side.

In the drawings, the arrow UP, the arrow FR, and the arrow RH indicate the upper side in the height direction, the front side in the depth direction, and the right side in the lateral width direction, respectively, of the notebook personal computer 32. In FIGS. 2 to 4, the notebook personal computer 32 is illustrated as inverted upside down, and the lower side of the drawings corresponds to the upper side of the notebook personal computer 32. In FIGS. 3 and 4, the left side of the drawings corresponds to the right side of the notebook personal computer 32.

The main device 34 has a housing 38. The housing 38 has a rectangular shape as seen from the side of an upper surface 38U (or a bottom surface 38S).

The main device 34 (in the housing 38) includes a control board. A processor, a memory, and various other electronic components are mounted on the control board. The control board is provided with a connection terminal for connection with an external storage device, an input/output device, etc. Meanwhile, the display device 36 is provided with a display panel such as a liquid crystal display. In FIGS. 1 to 4, the display device 36 is closed (folded) with respect to the main device 34.

Figure 5:
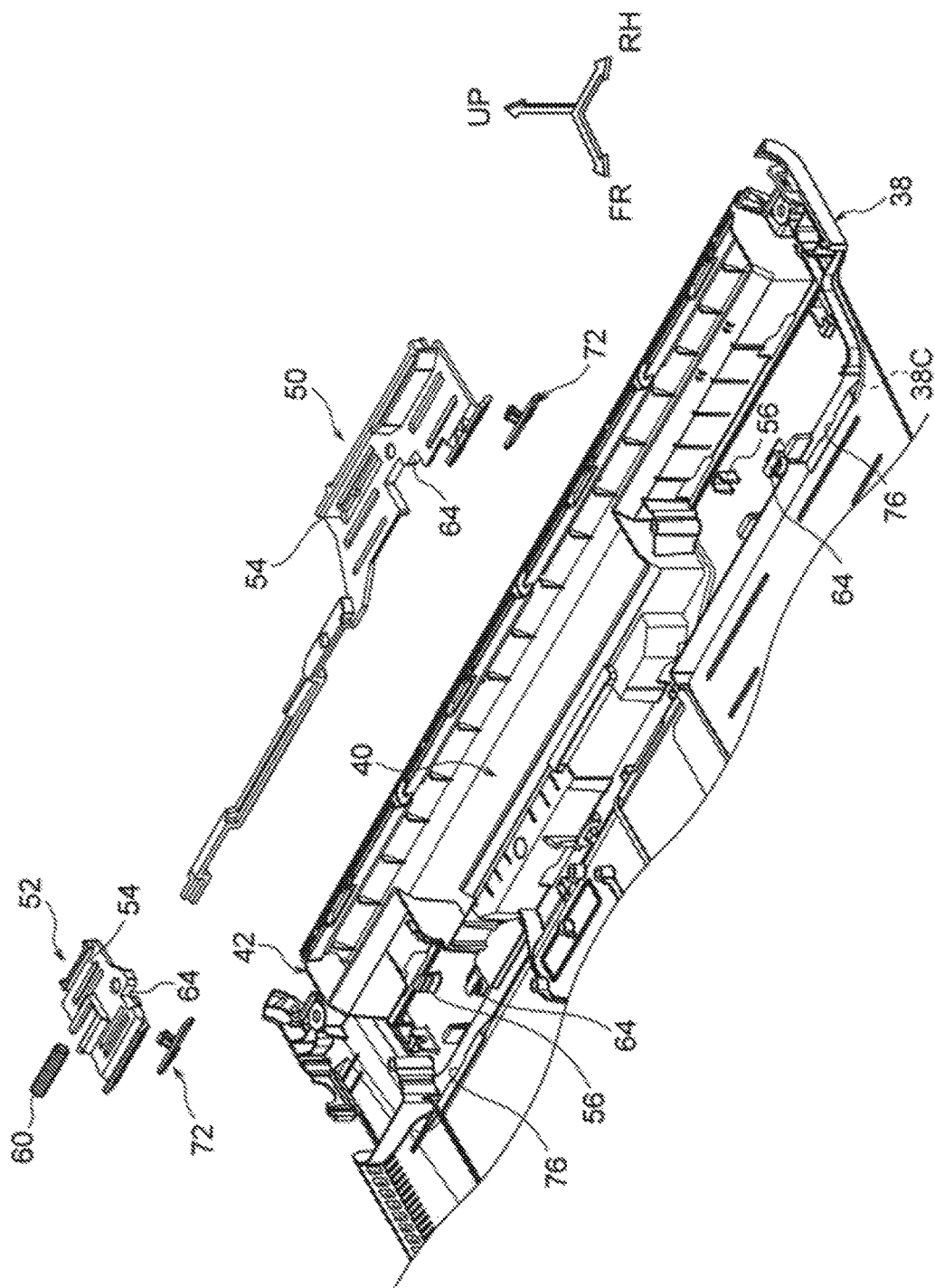
FIG. 5 illustrates an exemplary exploded perspective view of the information processing apparatus as partially enlarged.
Figure 6:
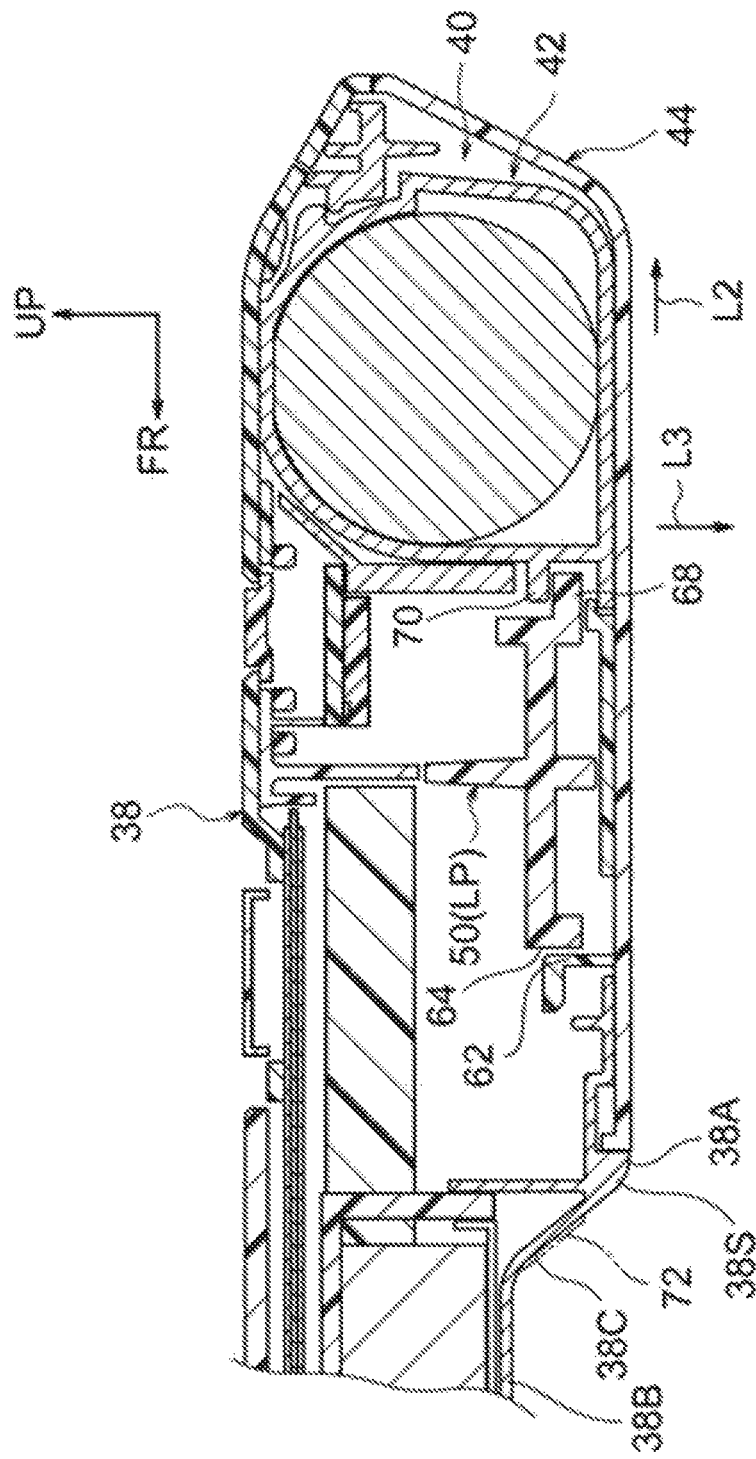
FIG. 6 illustrates an exemplary sectional view of the information processing apparatus.

As illustrated in FIGS. 5 and 6, the housing 38 is provided with a battery housing portion 40 that houses a battery 42

(also illustrated in FIG. 4). For example, a portion of the housing 38 in which the battery housing portion 40 is provided is thicker than a portion of the housing 38 in which the battery housing portion 40 is not provided. A stepped portion 38C is provided between a thick portion 38A in which the battery housing portion 40 is provided and a thin portion 38B in which the battery housing portion 40 is not provided. The stepped portion 38C is continuous with the thick portion 38A and the thin portion 38B.

The bottom surface 38S is provided with a plurality of support legs 38L. As illustrated in FIG. 1, when the notebook personal computer 32 is placed on a placement surface PS, the support legs 38L contact the placement surface PS. In this state, the thick portion 38A (in particular, the boundary portion with the stepped portion 38C) does not contact the placement surface PS.

As illustrated in FIG. 3, the battery housing portion 40 is closed by a cover 44 with the battery 42 housed in the battery housing portion 40. The cover 44 provides the bottom surface 38S of the housing 38 with an integrated appearance in which the thick portion 38A and the thin portion 38B are continuous with each other via the stepped portion 38C.

The cover 44 is formed with insertion lugs 46. The cover 44 is attached to the housing 38 at a certain attachment position by inserting the insertion lugs 46 into insertion holes of the housing 38 while moving the cover 44 from the back side toward the front side. To remove the cover 44 from the housing 38, for example, lock members 50, 52 are set to an unlock position KP to unlock the cover 44, which allows the cover 44 to be displaced backward.

The battery housing portion 40 is formed to extend along a long side 46 of the housing 38. In FIGS. 3 and 4, for example, the battery housing portion 40 is formed at a position that is close to a long side 46A on the back side, of the two long sides 46. The stepped portion 38C is also shaped to extend in the same direction as (in parallel with) the long side 46A.

Figure 7:
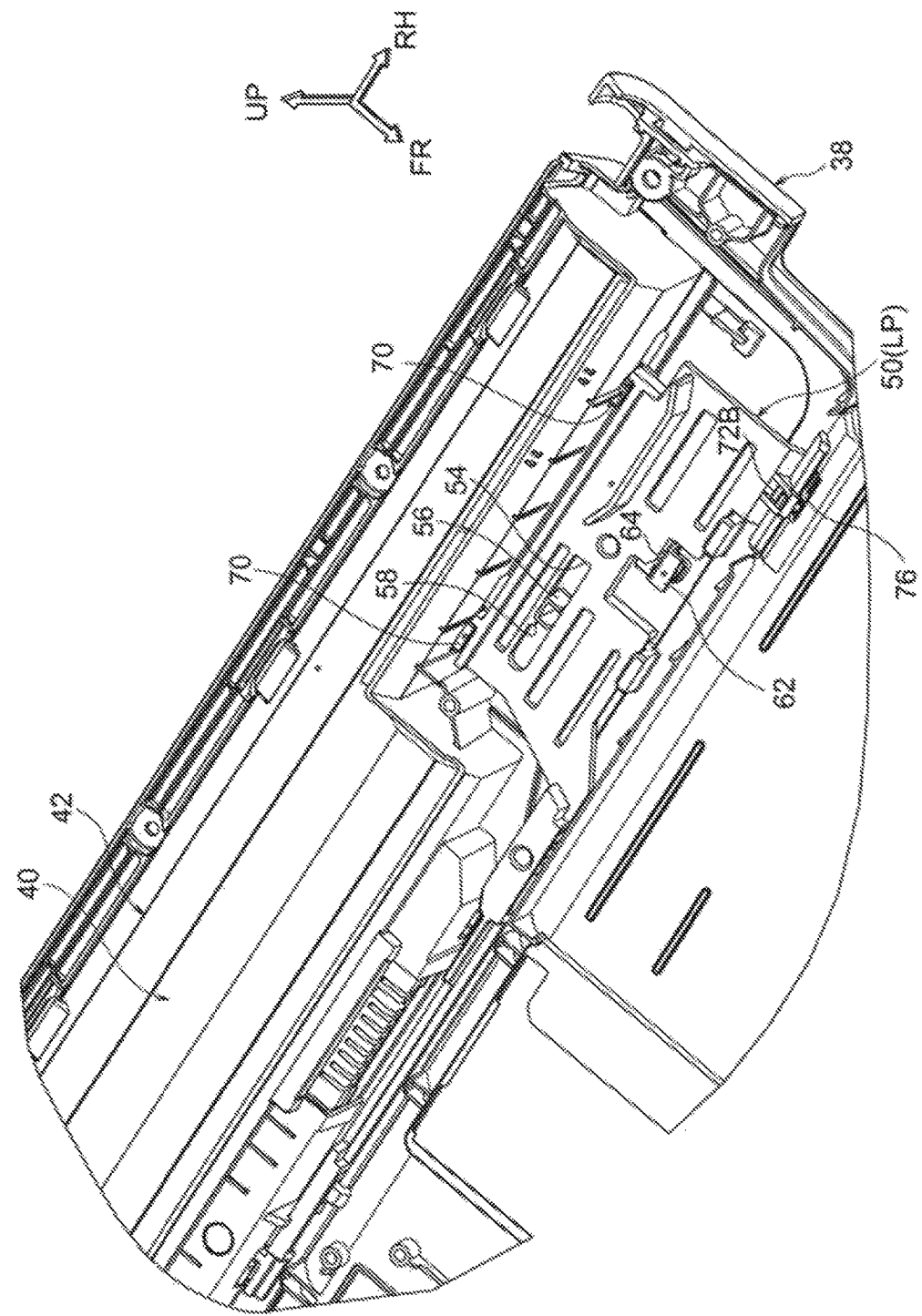
FIG. 7 illustrates an exemplary perspective view of the inside of the information processing apparatus as partially enlarged.
Figure 8:
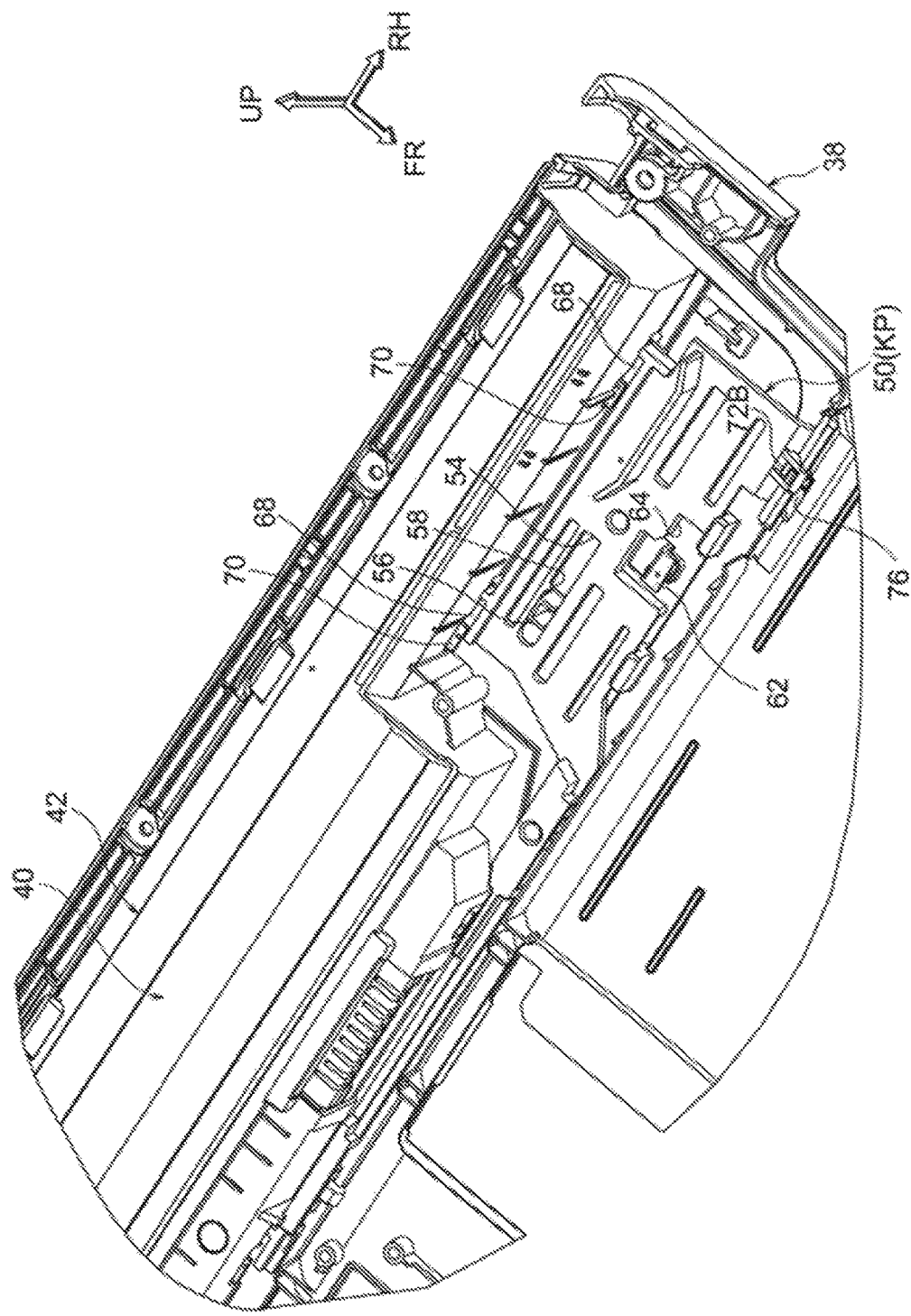
FIG. 8 illustrates an exemplary perspective view of the inside of the information processing apparatus as partially enlarged.
Figure 9:
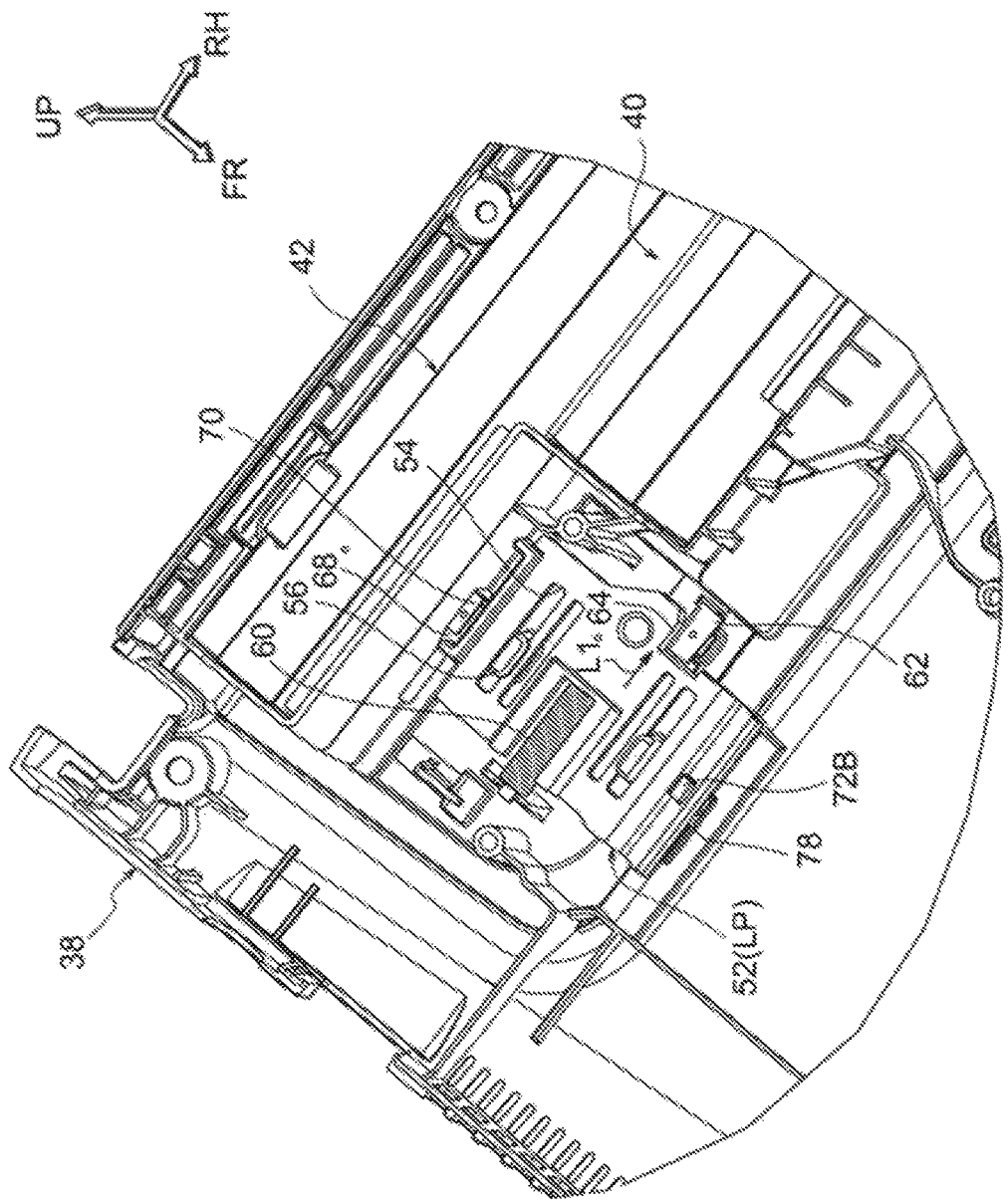
FIG. 9 illustrates an exemplary perspective view of the inside of the information processing apparatus as partially enlarged.
Figure 10:
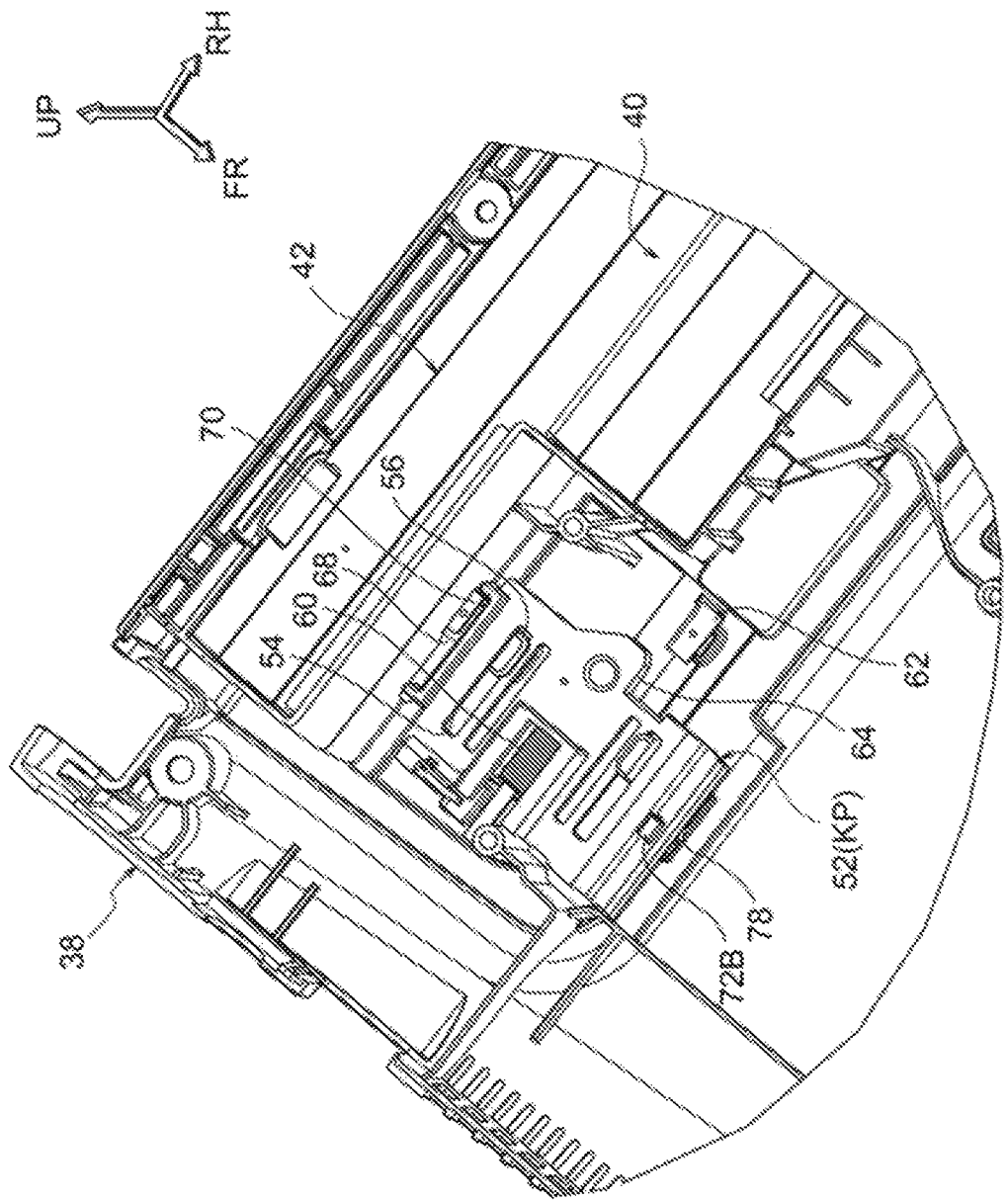
FIG. 10 illustrates an exemplary perspective view of the inside of the information processing apparatus as partially enlarged.

As illustrated in FIG. 5, a total of two lock members 50, 52 are disposed in the battery housing portion 40, one each on the left and right sides in the lateral width direction. The lock members 50, 52 are each movable in the lateral width direction. As illustrated in FIGS. 7 and 9, the lock members 50, 52 are located at a lock position LP when the lock members 50, 52 are moved toward the center in the lateral width direction. As illustrated in FIGS. 8 and 10, on the contrary, the lock members 50, 52 are located at the unlock position KP when the lock members 50, 52 are moved toward the end in the lateral width direction.

The lock members 50, 52 are formed with a long guide hole 54 that extends in the movement direction. The housing 38 is formed with a guide projection 56 to be fitted in the long guide hole 54. Movement of the lock members 50, 52 is guided with the guide projection 56 kept fitted in the long guide hole 54.

The long guide hole 54 of the lock member 50 is formed with a projected portion 58 that locally narrows the hole width. A moderate resistance is generated when the projected portion 58 abuts against the guide projection 56 during movement of the lock member 50.

The long guide hole 54 of the lock member 52 is not formed with a projected portion 58. A spring 60 is interposed between the lock member 52 and the housing 38. The spring 60 applies a spring force in the lock direction (in the direction of the arrow L1) to the lock member 52.

As illustrated in FIG. 6, the cover 44 is formed with a lock wall 62 that projects upward. The lock members 50, 52 are formed with a contact portion 64 that contacts the lock wall 62 on the back side when the lock members 50, 52 are located at the lock position LP. The term "contact" also includes a state in which two objects oppose each other with a small gap therebetween. Since the lock wall 62 contacts the contact portion 64 when the lock members 50, 52 are located at the lock position LP as also illustrated in FIGS. 7 and 9, the cover 44 is not movable toward the back side (in the direction of the arrow L2), and is locked at the position at which the cover 44 closes the battery housing portion 40. When the lock members 50, 52 are located at the unlock position KP as illustrated in FIGS. 8 and 10, on the contrary, the contact portion 64 is located away from the lock wall 62, and the cover 44 is movable toward the back side (in the direction of the arrow L2).

The lock members 50, 52 are formed with an engagement piece 68 that projects backward. As illustrated in FIG. 6, the battery 42 is formed with engagement lugs 70 corresponding to the engagement pieces 68. When the lock members 50, 52 are located at the lock position LP as also illustrated in FIGS. 7 and 9, the engagement pieces 68 oppose the engagement lugs 70 on the bottom surface 38S side with respect to the engagement lugs 70. Consequently, movement of the battery 42 toward the bottom surface 38S (in the direction of the arrow L3) is restricted so that the battery 42 is locked in the state of being housed in the battery housing portion 40. When the lock members 50, 52 are located at the unlock position KP as illustrated in FIGS. 8 and 10, on the contrary, the engagement pieces 68 are moved to a position at which the engagement pieces 68 are displaced from the engagement pieces 70 in the lateral width direction. Consequently, the battery 42 is movable toward the bottom surface 38S (in the direction of the arrow L3) so that the battery 42 is removable from the battery housing portion 40.

Figure 11:
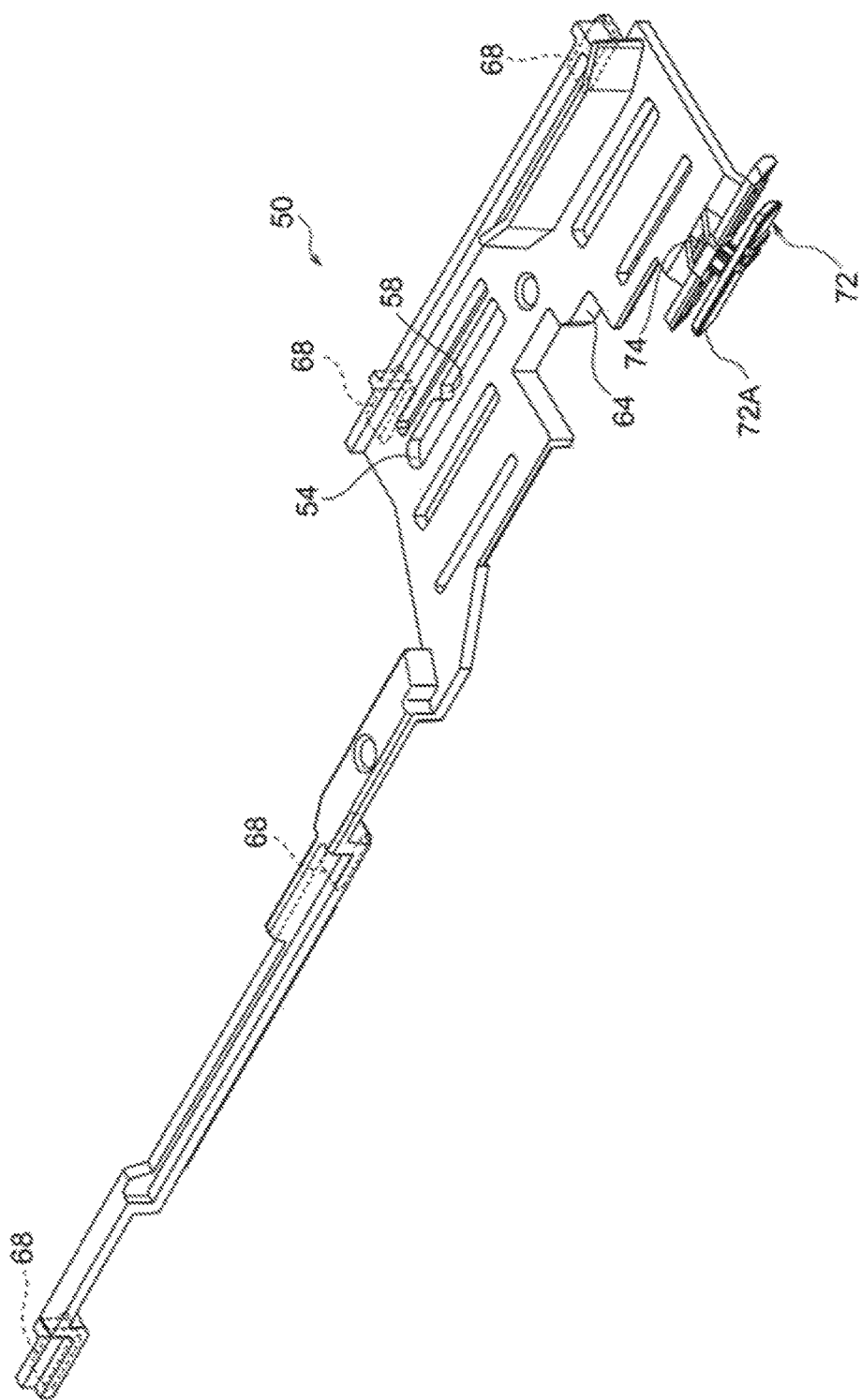
FIG. 11 illustrates an exemplary perspective view of a lock member of the information processing apparatus.
Figure 12:
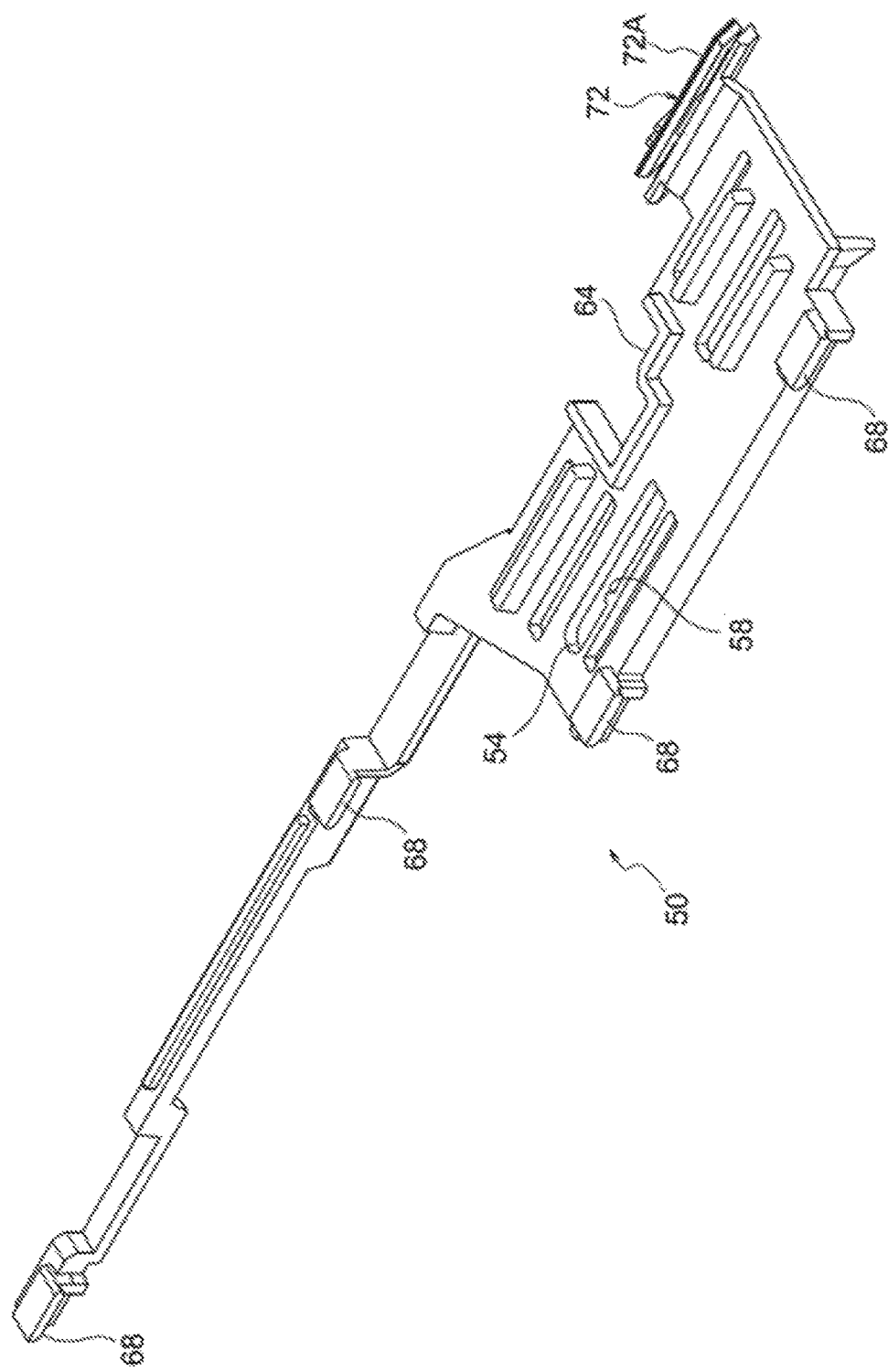
FIG. 12 illustrates an exemplary perspective view of the lock member of the information processing apparatus as inverted upside down.
Figure 13:
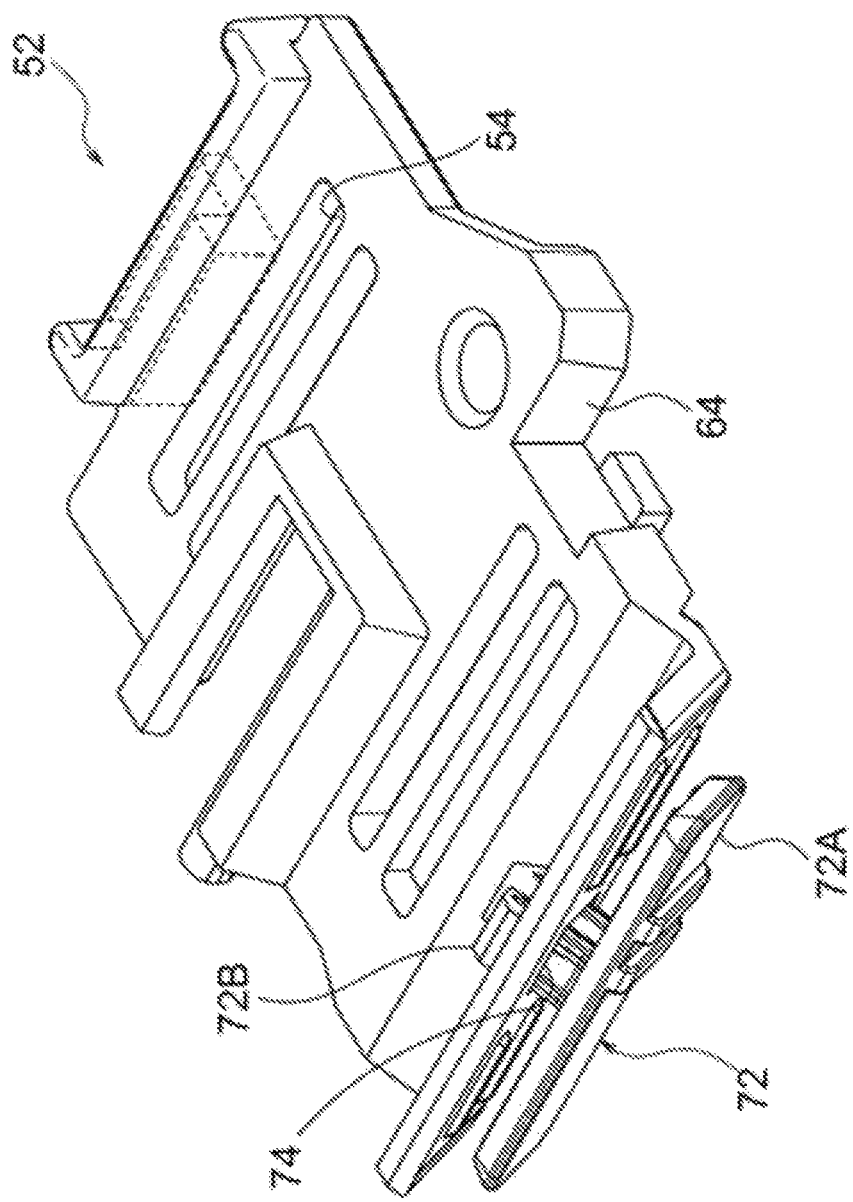
FIG. 13 illustrates an exemplary perspective view of the lock member of the information processing apparatus.
Figure 14:
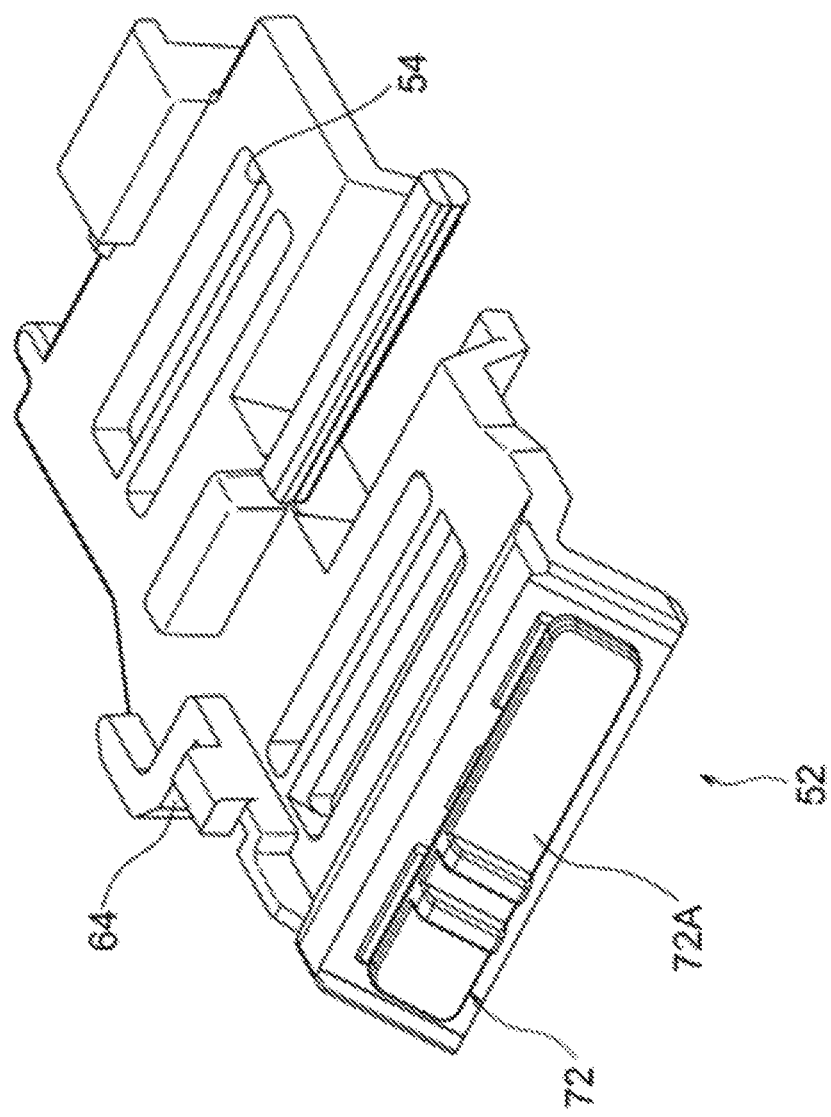
FIG. 14 illustrates an exemplary perspective view of the lock member of the information processing apparatus as inverted upside down.
Figure 15:
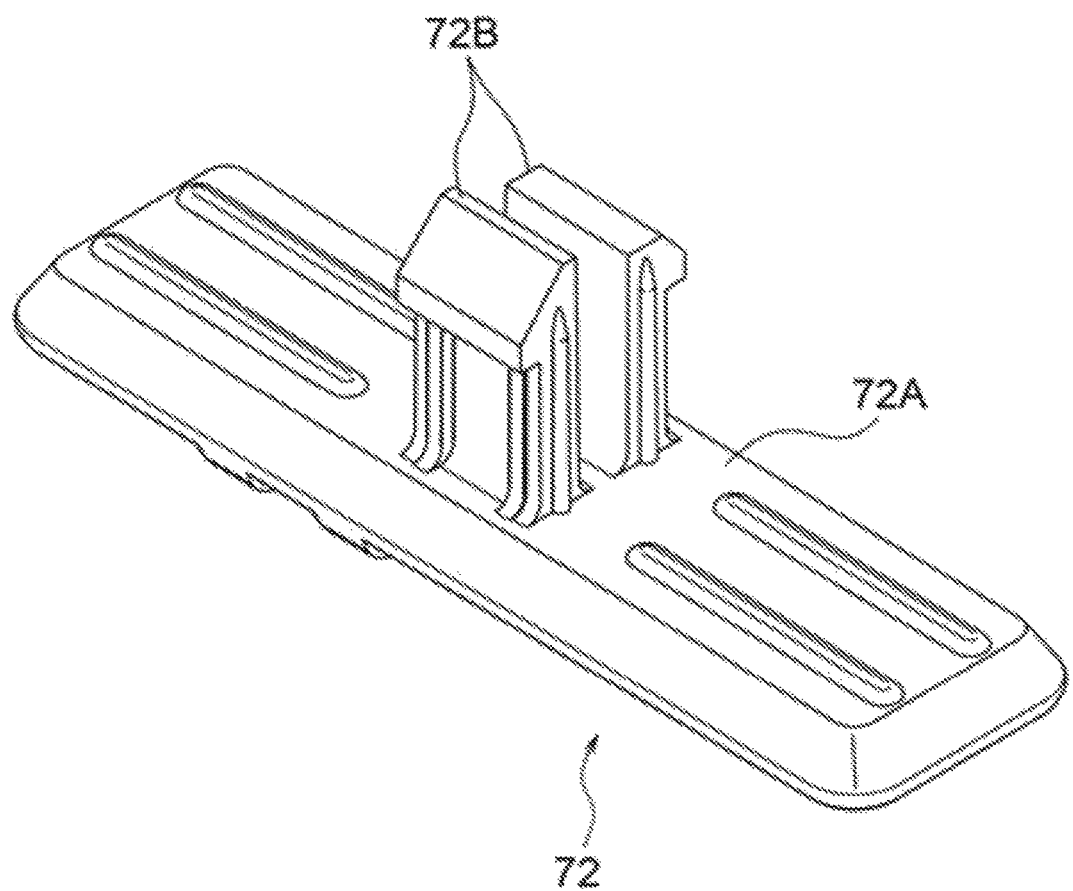
FIG. 15 illustrates an exemplary perspective view of an operation member of the information processing apparatus.

An operation member 72 is attached to the lock members 50, 52. As also illustrated in FIG. 15, the operation member 72 has a plate-like operation member body 72A and a pair of attachment pieces 72B that project from the operation member body 72A. As illustrated in FIGS. 11 and 13, the operation member 72 is attached to the lock members 50, 52 by inserting the attachment pieces 72B into an attachment hole 74 of the lock members 50, 52.

As illustrated in FIGS. 7 to 9, the stepped portion 38C is formed with insertion holes 76, 78 corresponding to the two operation members 72. The insertion holes 76, 78 are formed to have a certain length with the longitudinal direction of the stepped portion 38C (the direction along the long side 46A) defined as the longitudinal direction of the insertion holes 76, 78.

The attachment pieces 72B of the operation member 72 are attached to the lock member 50, 52 with the attachment pieces 72B inserted into the insertion hole 76, 78. That is, the operation member 72 is inserted through the insertion hole 76, 78 to be coupled to the lock members 50, 52 inside the housing 38.

With the operation member 72 coupled to the lock member 50, 52 in this way, the operation member 72 (operation member body 72A) is positioned on the outer surface side of the housing 38 and at the stepped portion 38C. The operation member 72 is slidable in the extension direction of the stepped portion 38C in the range of the stepped portion 38C. By sliding the operation member 72, the lock member 50, 52 to which the operation member 72 is attached is also moved between the lock position LP and the unlock position KP.

As illustrated in FIG. 5, the housing 38 includes the battery housing portion 40 which is provided in the outer surface. As illustrated in FIGS. 1 to 3 and 6, the battery housing portion 40 is closed by the cover 44 with the battery 42 housed in the battery housing portion 40, which provides a structure that does not expose the battery 42 housed therein.

When the lock members 50, 52 are located at the lock position LP with the battery 42 housed in the battery housing portion 40 and with the battery housing portion 40 closed by the cover 44, the contact portion 64 contacts the lock wall 62 of the cover 44 on the back side as illustrated in FIGS. 6, 7, and 9. Consequently, the cover 44 is not movable toward the back side (in the direction of the arrow L2), and is locked at the position at which the cover 44 closes the battery housing portion 40.

In this state, the engagement pieces 68 of the lock members 50, 52 oppose the engagement lugs 70 of the battery 42, and are positioned on the bottom surface 38S side with respect to the engagement lugs 70. Therefore, the battery 42 is not movable toward the bottom surface 38S (in the direction of the arrow L3), and thus the battery 42 is locked in the state of being housed in the battery housing portion 40.

In this way, when the lock members 50, 52 are located at the lock position LP, the lock members 50, 52 lock the cover 44, and also lock the battery 42.

As illustrated in FIGS. 8 and 10, when the lock members 50, 52 are moved to the unlock position KP, the contact portion 64 is moved in the lateral width direction away from the lock wall 62. Therefore, the cover 44 is unlocked, and is movable toward the back side (in the direction of the arrow L2).

In this way, the battery 42 can be reliably locked and unlocked with respect to the housing 38 by moving the lock members 50, 52 between the lock position LP and the unlock position KP.

In this state, the engagement pieces 68 of the lock members 50, 52 are also moved in the lateral width direction, and displaced from the engagement lugs 70 in the lateral width direction. Therefore, the battery 42 is unlocked, and is movable toward the bottom surface 38S (in the direction of the arrow L3).

In this way, both the lock members 50, 52 lock both the cover 44 and the battery 42 at the lock position LP, and unlock both the cover 44 and the battery 42 at the unlock position KP. Operation (movement) of the lock members 50, 52 locks and unlocks the cover 44 and the battery 42. For example, a member that locks the cover 44 and the battery 42 is commonly used. Therefore, operation may be facilitated and the number of components may be reduced compared to a structure in which a member that locks the cover 44 and a member that locks the battery 42 are provided separately.

The portion in which the battery housing portion 40 is provided is the thick portion 38A which is thicker than the portion in which the battery housing portion 40 is not provided (thin portion 38B). Therefore, a sufficient depth of the battery housing portion 40 is secured, and thus even a thick object, for example, the battery 42, can be housed in the battery housing portion 40.

The stepped portion 38C is positioned between the thick portion 38A and the thin portion 38B. For example, the bottom surface 38S (an example of the outer surface) which is integral and continuously extends from the thick portion 38A to the thin portion 38B through the stepped portion 38C can be formed by the stepped portion 38C.

The operation member 72 is disposed at the stepped portion 38C. The operation member 72 does not protrude from the housing 38 compared to a structure in which the operation member 72 is disposed at the thick portion 38A.

For example, as illustrated in FIG. 1, the operation member 72 is located at a position at which the operation member 72 does not contact the placement surface PS with the notebook personal computer 32 placed on the placement surface PS with the bottom surface 38S of the housing 38 facing downward. In this way, a structure in which the operation member 72 does not protrude from the housing 38 is provided, which may reduce the thickness of the main device 34 and also reduce the thickness of the notebook personal computer 32.

In order to move the lock member 50 which has been located at the lock position LP to the unlock position KP, the operation member 72 which is coupled to the lock member 50 is slid in the unlock direction (the direction of the arrow KD indicated in FIG. 3). The long guide hole 54 of the lock member 50 is formed with the projected portion 58. Thus, as illustrated in FIG. 8, the lock member 50 is maintained at the unlock position KP when the projected portion 58 has climbed over the guide projection 56. For example, the lock member 50 will not be accidentally moved to the lock position LP even if a worker releases his/her hand from the lock member 50, which may provide good workability.

To move the lock member 50 from the unlock position KP to the lock position LP, conversely, the operation member 72 is slid in the lock direction. Also in this case, the projected portion 58 climbs over the guide projection 56, and thus the lock member 50 is maintained at the lock position LP in this state.

On the contrary, the lock member 52 is urged toward the lock position LP by the spring 60. Thus, when the worker is not applying a force for sliding the operation member 72 toward the unlock position, the lock member 52 is located at the lock position LP, which will not accidentally unlock the cover 44 or the battery 42.

The operation member is not limited to a slidable structure. For example, an operation member that converts a push into the housing 38 into movement of the lock member 50, 52 may also be used. An operation member that converts a pinch and rotation into movement of the lock member 50, 52 may also be used. The operation member 72 may be slidable to move the lock member 50, 52 between the lock position LP and the unlock position. If the operation member 72 is slidable to move the lock member 50, 52, operation may be facilitated. A mechanism that converts a push and rotation into movement of the lock member 50, 52 may not be desired.

The operation member 72 is slid in the range of the stepped portion 38C. Even if the operation member 72 is slid, the operation member 72 is not movable over the stepped portion 38C, and is maintained in the state in which the operation member 72 does not protrude from the housing 38.

The stepped portion 38C extends in parallel with the long side 46A which is a side of the housing 38. The slide direction of the operation member 72 coincides with the extension direction of the stepped portion 38C. Thus, a long slidable length may be secured compared to a structure in which the operation member 72 is slidable in the width direction of the stepped portion 38C.

The slide direction of the operation member 72 is the same as the movement direction of the lock members 50, 52. For example, sliding the operation member 72 directly moves the lock members 50, 52. For example, a structure that moves the lock members 50, 52 by converting the slide direction of the operation member 72 is not desired, which may simplify the structure.

The stepped portion 38C is formed with the insertion holes 76. With a simple structure in which the attachment pieces 72B of the operation members 72 inserted through the insertion holes, the operation members 72 which are positioned outside the housing 38 are coupled to the lock members 50, 52 which are located inside the housing 38.

A pair of lock members 50, 52 are provided away from each other in the extension direction of the stepped portion 38C. Use of the two lock members 50, 52 may ensure both lock of the cover 44 and lock of the battery 42, for example. A pair of operation members 72 are provided in correspondence with the lock members 50, 52. Thus, the lock members 50, 52 are moved by sliding the operation members 72.

The member to be housed may be the battery 42, for example, or may be a fuel cell, a substrate, an extension unit, or the like to be attached to the main device 34.

The position at which the cover 44 covers the outer surface of the housing 38 may correspond to the position of the thick portion 38A (housing portion 40). A structure in which the cover 44 covers the thin portion 38B, for example, may also be provided. A structure in which the cover 44 covers the outer surface of the housing 38 at a location other than the housing portion may also be provided. For example, a structure in which the housing 38 is formed with an opening for a connector for connection with another information processing apparatus may be provided with a structure in which the opening is covered by the cover 44.

Figure 16:
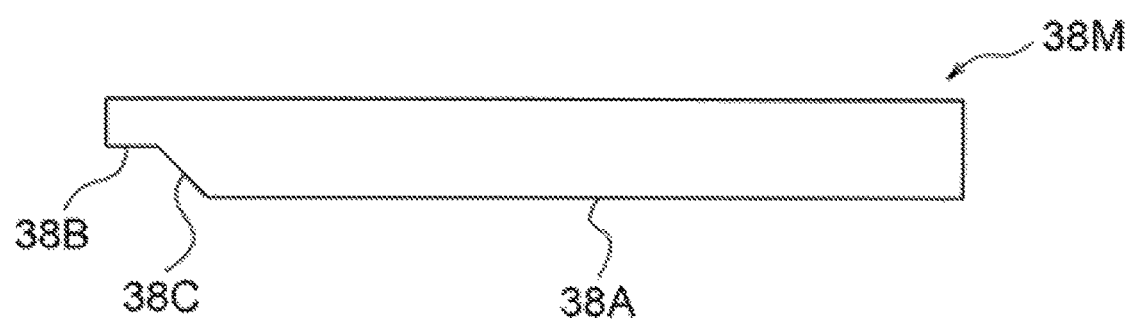
FIG. 16 illustrates an exemplary side view illustrating the structure of a housing.
Figure 17:
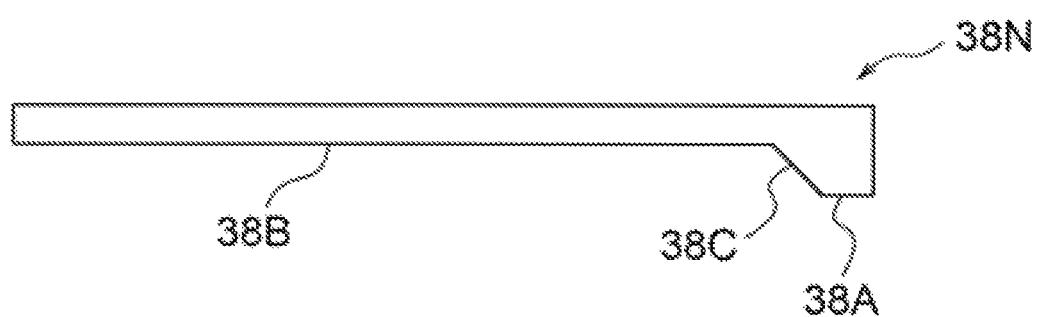
FIG. 17 illustrates an exemplary side view illustrating the structure of a housing.
Figure 18:
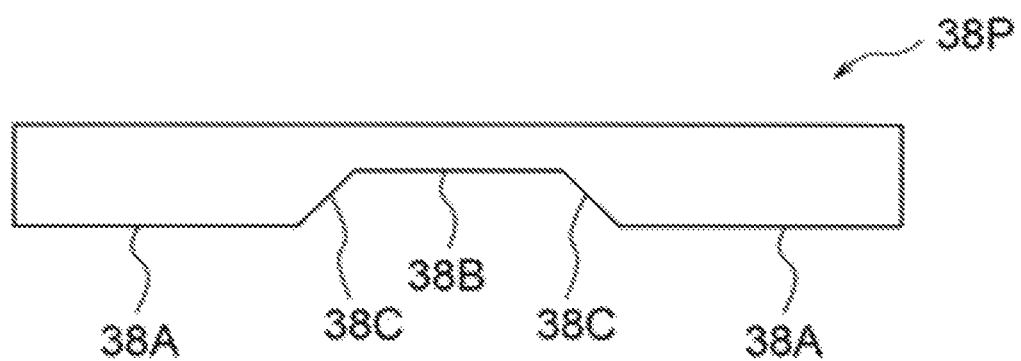
FIG. 18 illustrates an exemplary side view illustrating the structure of a housing.
Figure 19:
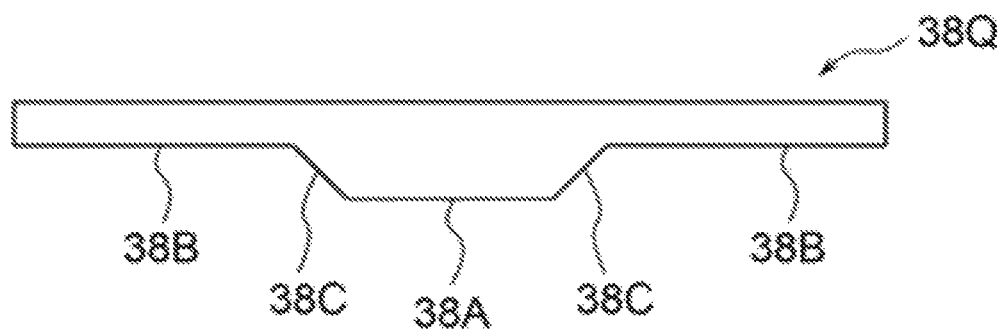
FIG. 19 illustrates an exemplary side view illustrating the structure of a housing.

Examples of the shape of the housing may include a structure in which the thick portion 38A is wide and the thin portion 38B is narrow as in a housing 38M illustrated in FIG. 16, and a structure in which the thick portion 38A is narrow and the thin portion 38B is wide as in a housing 38N illustrated in FIG. 17. Additional examples may include a structure having two thick portions 38A provided on both sides and one thin portion 38B provided at the middle as in a housing 38P illustrated in FIG. 18, and a structure having one thick portion 38A provided at the middle and two thin portions 38B provided on both sides as in a housing 38Q illustrated in FIG. 19.

The inclination angle of the stepped portion 38C with respect to the thick portion 38A or the thin portion 38B is not specifically limited. For example, the stepped portion 38C may be formed to extend in a direction that is orthogonal to the thick portion 38A or the thin portion 38B.

The information processing apparatus may be a notebook personal computer, or may be a foldable cellular phone, a merchandise management terminal, an electronic dictionary, a video playback device, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a housing including a first outer surface and a second outer surface which projects from the first outer surface and is coupled to the first outer surface via a stepped portion having a slope between the first outer surface and the second outer surface;
   a cover configured to cover at least a part of an outer surface of the housing and including the second outer surface;
   a lock member movable between a lock position at which the cover is locked with respect to the housing and an unlock position at which the cover is unlocked with respect to the housing; and
   an operation member, disposed at the slope of the stepped portion, configured to move the lock member between the lock position and the unlock position.

2. The information processing apparatus according to claim 1, wherein the operation member is slidable to move the lock member.

3. The information processing apparatus according to claim 2, wherein the operation member is slidable in a range of the stepped portion.

4. The information processing apparatus according to claim 3, wherein the stepped portion extends in parallel with a side of the housing, and a slide direction of the operation member is substantially identical to an extension direction of the stepped portion.

5. The information processing apparatus according to claim 4, wherein a movement direction of the lock member coincides with the slide direction of the operation member.

6. The information processing apparatus according to claim 1, wherein an insertion hole is formed at the stepped portion, and the operation member is coupled to the lock member inside the housing via the insertion hole from outside the housing.

7. The information processing apparatus according to claim 4, wherein a pair of lock members and a pair of operation members are provided away from each other in the extension direction of the stepped portion.

8. The information processing apparatus according to claim 1, wherein the housing includes a housing portion provided in the outer surface to be covered by the cover, and a member is housed in the housing portion.

9. The information processing apparatus according to claim 8, wherein the lock member locks and unlocks the member with respect to the housing.

10. The information processing apparatus according to claim 9, wherein the lock member locks the cover and the member at the lock position, and unlocks the cover and the member at the unlock position.

11. The information processing apparatus according to claim 8, wherein a portion of the housing in which the housing portion is provided is thicker than a portion of the housing in which the housing portion is not provided.

12. An information processing apparatus comprising:
    a housing including a stepped portion on an outer surface;
    a cover configured to cover at least a part of an outer surface;
    a lock member movable between a lock position at which the cover is locked with respect to the housing and an unlock position at which the cover is unlocked with respect to the housing; and
    an operation member, disposed at the stepped portion, configured to move the lock member between the lock position and the unlock position,
    wherein the housing includes a housing portion provided in the outer surface to be covered by the cover, and a member is housed in the housing portion,
    wherein a portion of the housing in which the housing portion is provided is thicker than a portion of the housing in which the housing portion is not provided, and wherein the stepped portion is provided between the portion at which the housing portion is provided and the portion at which the housing portion is not provided.

13. The information processing apparatus according to claim 1, wherein the lock member includes a first portion having a first width and a second portion having a second width wider than the first width and the operation member is attached to the second portion.

14. The information processing apparatus according to claim 1, wherein an end side of the cover is in contact with a sidewall of the housing which extends from a third outer surface opposite to the first outer surface and the second outer surface.

\* \* \* \* \*